(12) United States Patent
Xiong et al.

(10) Patent No.: US 10,333,838 B2
(45) Date of Patent: Jun. 25, 2019

(54) FRAME TRANSMISSION METHODS AND DEVICES

(71) Applicant: UBTECH Robotics Corp., Shenzhen (CN)

(72) Inventors: Youjun Xiong, Shenzhen (CN); Hailang Zhou, Shenzhen (CN); Musen Zhang, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 47 days.

(21) Appl. No.: 15/649,590

(22) Filed: Jul. 13, 2017

(65) Prior Publication Data

US 2018/0191611 A1    Jul. 5, 2018

(30) Foreign Application Priority Data

Dec. 30, 2016 (CN) .......................... 2016 1 1253185
Dec. 30, 2016 (CN) .......................... 2016 1 1253201
Dec. 30, 2016 (CN) .......................... 2016 1 1253203

(51) Int. Cl.
*H04L 12/721* (2013.01)
*H04L 12/403* (2006.01)
*H04L 12/40* (2006.01)

(52) U.S. Cl.
CPC ............ *H04L 45/72* (2013.01); *H04L 12/403* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | | |
|---|---|---|---|---|
| 8,737,426 | B1* | 5/2014 | Fredriksson | H04J 3/0602 370/464 |
| 9,954,892 | B2* | 4/2018 | Elend | H04L 1/0045 |
| 10,142,358 | B1* | 11/2018 | Bajpai | H04L 63/1425 |
| 2008/0183835 | A1* | 7/2008 | Uemura | G06F 11/2215 709/207 |
| 2014/0071995 | A1* | 3/2014 | Hartwich | H04L 1/0002 370/468 |
| 2014/0328357 | A1* | 11/2014 | Fredriksson | H04J 3/0614 370/520 |
| 2015/0089236 | A1* | 3/2015 | Han | H04L 9/3242 713/181 |
| 2016/0080168 | A1* | 3/2016 | Lieder | H04L 12/40032 370/468 |
| 2016/0254924 | A1* | 9/2016 | Hartwich | H04L 69/10 370/468 |
| 2017/0093659 | A1* | 3/2017 | Elend | H04L 43/08 |
| 2017/0109309 | A1* | 4/2017 | van de Burgt | G06F 13/4031 |

* cited by examiner

*Primary Examiner* — Michael J Moore, Jr.

(57) ABSTRACT

The present disclosure relates to a frame transmission method and a frame transmission device. The data frame includes an arbitration field and a data field. The arbitration field includes a frame mode indication sub-field indicating a frame mode of the data frame, and the data field includes an instruction sub-field indicating instruction messages carried the data frame. A great deal of information may be obtained by the configuration of the present disclosure, and thus the transmission efficiency may be enhanced.

20 Claims, 5 Drawing Sheets

FRAME TRANSMISSION METHODS AND DEVICES

CROSS REFERENCE TO RELATED APPLICATIONS

This application claims priority to Chinese Patent Application Nos. 201611253185.2, 201611253201.8, 201611253203.7, all filed Dec. 30, 2016, which are hereby incorporated by references herein in their entirety.

BACKGROUND

1. Technical Field

The present disclosure relates to communication field, and particularly to a frame transmission method and the device thereof.

2. Description of Related Art

Controller Area Network (CAN) bus is a serial communication protocol for real-time applications, and is a point-to-multipoint mechanism. The CAN has been adopted in a variety of industries, such as, textile machinery, agricultural machinery, robots, CNC machine tools, medical equipment and sensors.

The variety and the complexity of the communication devices have been increased along with the enhancement of the communication devices. Under the circumstance, the transmission capability with respect to message control has faced a great challenge. Conventionally, when the control messages are transmitted by data frames under the CAN protocol, the types of the control messages and the transmission status cannot be identified quickly, which results in a low transmission efficiency.

DETAILED DESCRIPTION

Figure 1:
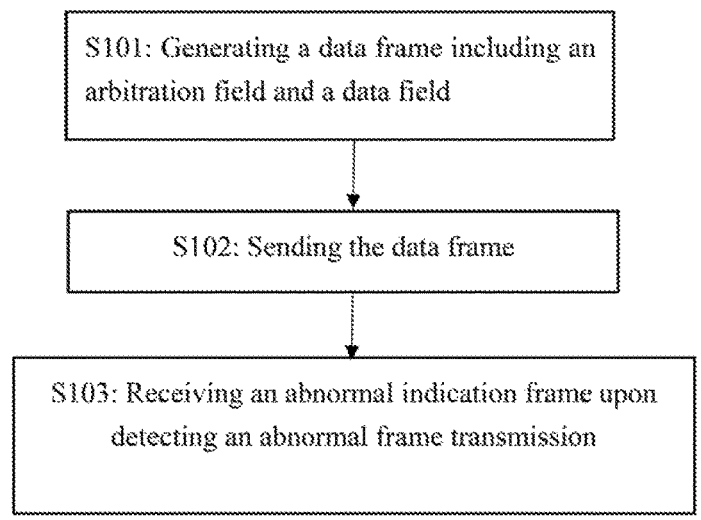
FIG. 1 is a flowchart illustrating the frame transmission method in accordance with a first embodiment of the present disclosure.

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

CAN protocol relates to a point-to-multipoint and serial communication protocol for real-time applications. The CAN adopts twisted pair to transmit signals, which is one of the most widely used field buses in the world. The CAN protocol is robust, and thus may be widely used in the field of automation and other applications.

The communication node on the CAN bus may be divided into a standard node and a thin node according to the function, wherein the standard node is a node with a complete function specified by the protocol, and the thin node provided with some functions specified by the protocol. In an example, the thin nodes are only provided with the basic functions specified by the protocol. Usually the cost for the thin nodes is cost, and the memory resources are limited.

The communication node on the CAN bus can be divided into the master node and the controlled node. The master node sends an instruction to the controlled node and requests the corresponding node to perform the corresponding operation. It can be understood by those skilled in the art that the number of the master nodes and the controlled nodes on the CAN bus can be flexibly configured accordingly, and the present disclosure is not limited thereto.

A data frame is defined in the CAN protocol for data transmission between different communication nodes. The data frame includes seven portions, including a frame start, an arbitration field, a control field, a data field, a cyclic redundancy check (CRC) field, a response field, and a frame end. In particular, the data frame includes a standard data frame and an extended data frame in which the main difference between the standard data frame and the extended data frame is that the number of bits of the identifier (ID) of the arbitration field is different.

FIG. 1 is a flowchart illustrating the frame transmission method in accordance with a first embodiment of the present disclosure.

Figure 2A:
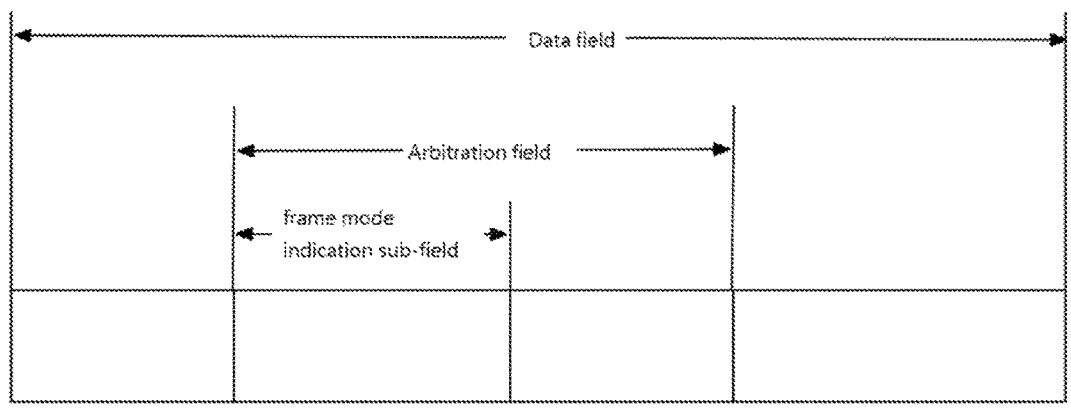
FIGS. 2A-2C are schematic views showing the data frames in accordance with one embodiment of the present disclosure.
Figure 2B:
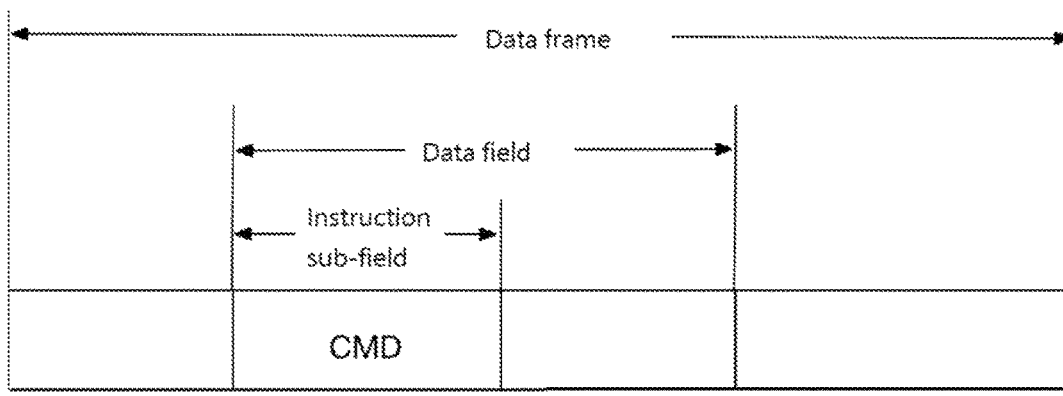
Figure 2C:
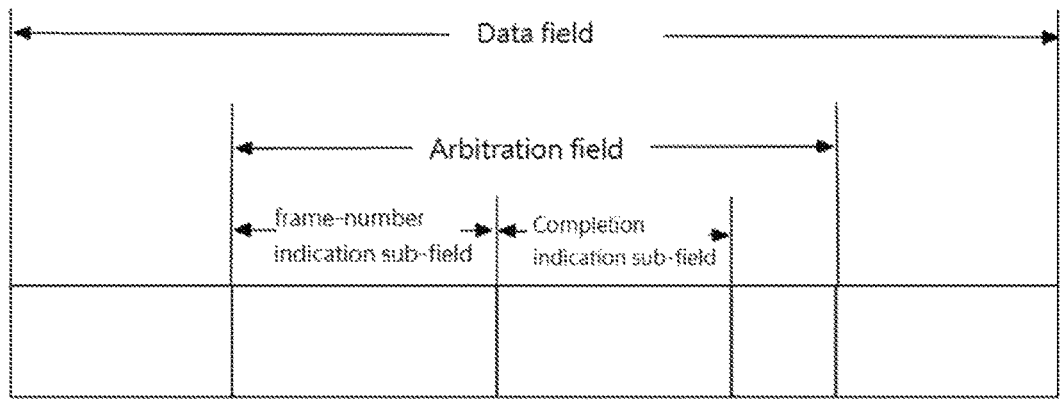

In step S101, generating a data frame, wherein the data frame includes an arbitration field having a frame mode indication sub-field indicating a frame mode of the data frame, as shown in FIG. 2A. In addition, the data frame includes a data field having an instruction sub-field, as shown in FIG. 2B, indicating instruction messages carried by the data frame. In an example, the arbitration field also includes a frame-number indication sub-field and a completion indication sub-field, as shown in FIG. 2C. The frame-number indication sub-field indicates a frame number of the data frames, and the frame number is a positive integer smaller than $2^N$, wherein N relates to a number of bits for the frame-number indication sub-field, and the completion indication sub-field indicates a frame transmission status.

In step S102, sending the data frame.

It can be understood that, as shown in FIGS. 2A-2C, the locations of the arbitration field and the data field in the data frame are not limited to the present disclosure. Also, the locations of the frame mode indication sub-field, the frame-number indication sub-field, and the completion indication sub-field, and the instruction sub-field, in the data field are not limited to the present disclosure.

A length of the frame mode indication sub-field may be configured according to the number of the frame modes in real scenarios. In an example, when there are four frame modes, the frame mode indication sub-field may be of 2 bits. In another example, when there are six frame modes, the frame mode indication sub-field may be at least 3 bits.

In particular, a plurality of bits may be reserved within the frame mode indication sub-field for future enhancement.

A length of the instruction sub-field may be configured according to the number of the instructions in real scenarios. In an example, the instruction message may be encode by 8 bits, and thus the instruction sub-field includes 8 bits. It can be understood that a plurality of bits may be reserved within the instruction sub-field for future enhancement.

As shown in Table. 1, Table. 2, and Table. 3, the data frame is one of a standard data frame and an expanded data frame, a length of the frame mode indication sub-field in the standard data frame is less than a length of the frame mode indication sub-field in the expanded data frame, and the frame mode indication sub-field indicates purpose of the data frame. Alternatively, the data frames may include, but not limited to, Table. 1.

TABLE 1

| Frame mode of Data Frame | Description |
| --- | --- |
| Node control instruction frame | Control messages of nodes |
| Node return instruction frame | Response messages in response to the control messages of nodes |
| String code frame of uploading node | Uploading the attributes of the controlled node |
| Identification frame of configuring node | Allocating the channel IDs |
| Instruction frame of data control | Control messages of data transmission |
| Instruction frame of data return | Response messages in response to the control messages of data transmission |
| Data output frame | Data |
| Data input frame | Data |

The Node control instruction frame is sent from the master node to the controlled node for controlling the controlled node to execute corresponding operations, such as reporting status or attributes. In an example, when the controlled node is a steering gear or a driving wheel, the master node may send the node control instruction frame to the controlled node such that the controlled node may execute specific actions. When the controlled node is a sensor, in response to the node control instruction frame, the controlled node collects data and reports the data. Generally, the node control instruction frame is the frame having the greatest priority.

Node return instruction frame is sent from the controlled node to the master node for responding to the instructions received fey the controlled node. That is, the controlled node sends corresponding information to the master node in accordance with the received instructions.

String code frame of uploading node is sent from the controlled node to the master node for indicating attributes of the controlled node. The string code frame of the uploading node may include, but not limited to, Vender ID (VID), Product ID (PID), and string codes.

Identification frame of configuring node is sent from the master node to the controlled node for allocating Channel ID for the controlled node.

Instruction frame of data control is sent from the master node to the controlled node to control the transmission of data blocks, such as initialization of block transmission, confirming the usage of data blocks, and controlling the retransmission of data blocks.

Instruction frame of data return is sent from the controlled node to the master node in response to the received instruction of data transmission. That is, the controlled node transmits the corresponding messages to the master node according to the instructions of data transmission.

Data output frame controls the master node to send data, including texts, images, and audio/video, to the controlled node.

Data input frame controls the controlled node to send data, including texts, images, and audio/video, to the master node.

In addition, the data frame may include the frame modes except for those shown in Table. 1. Persons skilled in the art may identify and label the frame mode with respect to any data frames in view of the present disclosure.

Figure 3A:
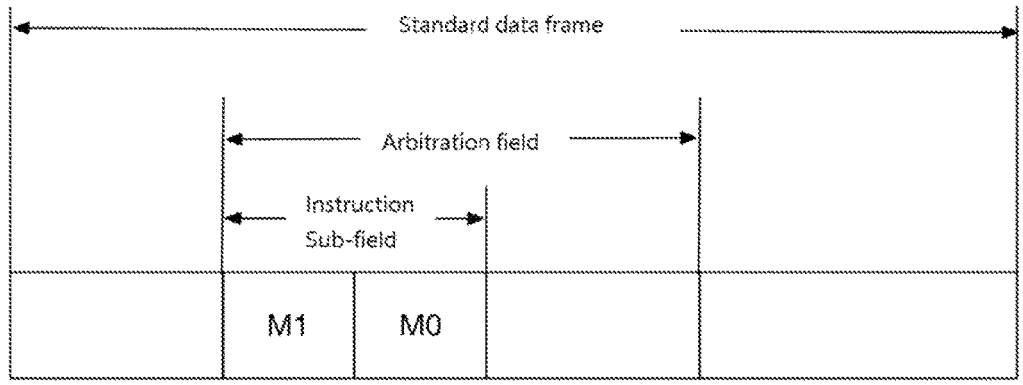
FIGS. 3A and 3B are schematic views showing the data frame in accordance with another embodiment of the present disclosure.

In an example, when the data frame is a standard data frame, as shown in FIG. 3A, the frame mode indication sub-field may indicate any one of the frame modes of the data frame. The frame modes are shown as below.

A node control instruction frame; or a node return instruction frame.

In an example, the standard frame mode indication sub-field may be of 2 bits, which are respectively M1 and M0, as shown in Table. 2.

TABLE 2

| frame mode indication sub-field | Frame modes of data frame |
| --- | --- |
| 00 | Node control instruction frame |
| 01 | Node return instruction frame |

Figure 3B:
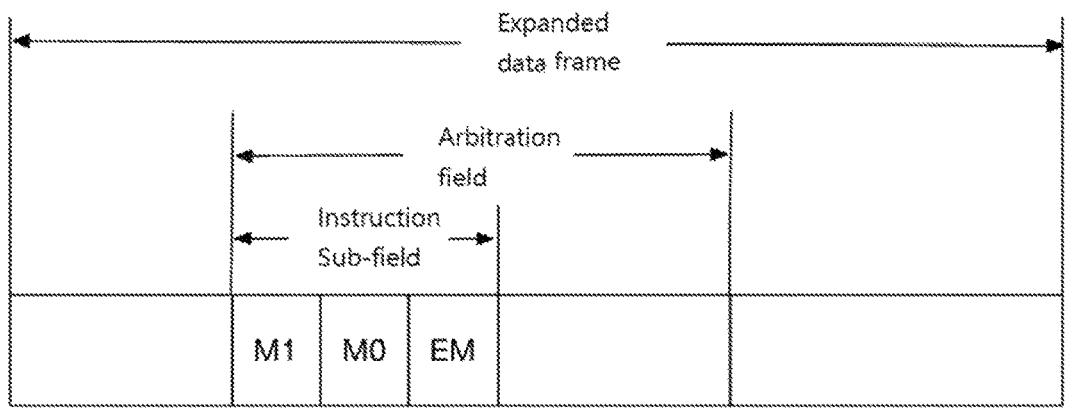

As shown in FIG. 3B, the expanded frame mode indication sub-field may indicate one of the frame modes, including node control instruction frame, node return instruction frame, string code frame of uploading node, identification frame of configuring node, block control instruction frame, block return instruction frame, output frame of data block, or input frame of data block.

In an example, the expanded frame mode indication sub-field may be of 3 bits, which are respectively M1, M0, EM, as shown in Table. 3.

TABLE 3

| Expanded frame mode indication sub-field | Frame modes of data frame |
| --- | --- |
| 000 | Node control instruction frame |
| 010 | Node return instruction frame |
| 001 | String code frame of uploading node |
| 011 | Identification frame of configuring node |
| 100 | Block control instruction frame |
| 110 | Block return instruction frame |
| 101 | Output frame of data block |
| 111 | Input frame of data block. |

It is to be noted that Table. 2 and Table. 3 are only examples. That is, the bits of the frame mode indication sub-field corresponding, to the bits may be adjusted accordingly. In another example, more than 3 bits may be configured in any locations of the frame mode indication sub-field.

In step S102, the communication node transmits the date frame including the frame mode indication sub-field generated in step S101 by the bus.

In an example, the data frame may include, but not limited to, Table. 4.

TABLE 4

| CMD | Instruction message | Descriptions |
|---|---|---|
| FE | Instructions requesting attributes | Master node requests the upload of the node attributes |
| FD | Replying attributes | Acknowledge the upload of the node attributes to the master node |
| FC | Requesting for deleting the updated data area | Master node requests the node to delete the updated data area |
| FB | Replying to the request of deleting the updated data area | Acknowledge the deletion of the updated data area |
| FA | Instructions for requesting the transmission of upgraded data | Master node requests the node to transmit the upgraded data, and the volume of the upgraded data |
| F9 | Replying to the request of transmission of upgraded data | Reporting the status of the upgraded data area to the master node. The volume of the upgraded data area will be reported when the upgraded data area has been received. |
| F8 | Sending the instruction indicating that the upgraded data area has been fully transmitted | The master node notifies the controlled node that the upgraded data has been fully transmitted. |
| F7 | Replying the status of the transmission of upgraded data area | Confirming with the master node about whether the upgraded data area has been received correctly. |
| F6 | Abnormal reception of data block | Master node notifies the node that the data blocks may be lost. |
| F5 | Abnormal reception of data block | Node notifies the master node that the data block may be lost |
| F4 | Instructions requesting the node to receive parameters | Master node requests the node to receive the corresponding parameters within the data block |
| F3 | Replying to the request of parameter reception | Confirming with the master node that the node is ready to receive the corresponding parameters. |
| F2 | Instructions requesting the node to configure the parameters | Master node requests the node to configure the corresponding parameters, stored in the buffer, to a parameter table. |
| F1 | Replying the status of parameter configuration | The node reports to the master node about the status of parameter configuration |
| F0 | Instructions requesting the node reset the parameters | Master node requests the node to reset the parameters to predetermined values. |
| EF | Replying the status of parameter reset | The node reports to the master node about the status of parameter reset. |
| EE | Requesting node reset | Master node requests node reset. |
| ED | Replying to node reset | Confirming with the Master node about node reset. |
| EC | Requesting the node to report status | Querying the node status. |
| EB | Reporting the node status | Reporting the node status. |
| EA | Heartbeats of master node | For a supplemental data frame, the frame will be sent if the master node has not sent the data frame to the node within one second. |
| E9 | Heartbeats of node | For a supplemental data frame, the frame will be sent if the node has not sent the data frame to the master node within one second. |
| E8 | Requesting the node to upload the string code ID | Requesting the node to upload the PID, VID, and shine code. |

The CMD relates to the codeword of the instruction message. The CMD The encoded CMD codeword is a hexadecimal number indicating the instruction message. It can be understood that the coding algorithms and the length of the codeword are not limited to Table. 4.

The instruction messages may include node instruction messages or block instruction messages, wherein the node instruction messages relate to the instructions for the communication nodes, and the block instruction messages relate to the instructions for the transmitted data blocks. The instruction messages listed in Table. 4 are only examples. It can be understood that a variety of instruction messages and different combination of the instruction messages may be adopted in accordance with real scenarios.

It can also be understood that the instruction sub-field may carry the instruction messages listed on Table. 4, but the present disclosure is not limited thereto.

In an example, the instruction sub-field may be of 8 bits for carrying the encoded instruction messages, but the present disclosure is not limited thereto.

Figure 4:
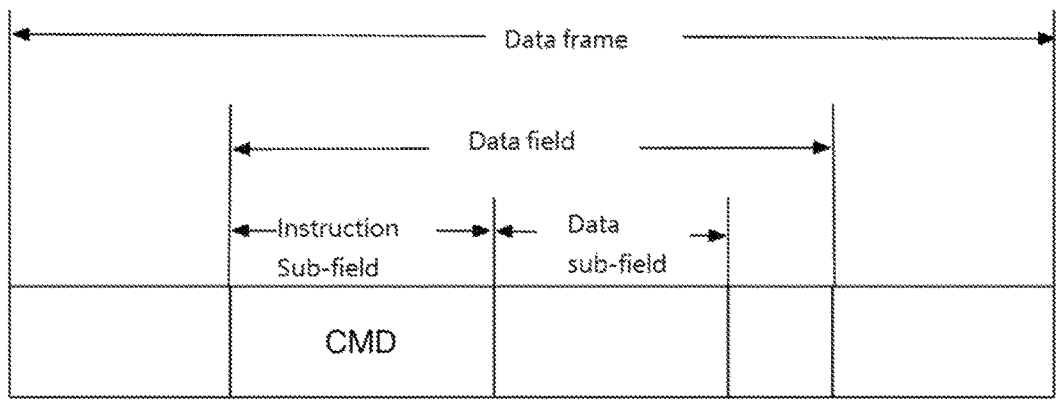
FIG. 4 is a schematic view showing the data frame in accordance with another embodiment of the present disclosure.

Alternatively, the data field of the data frame may include the data sub-field, as shown in FIG. 4, indicative of information corresponding to the data. In an example, when the instruction messages carried by the instruction sub-field relates requesting the transmission of upgraded data, the data sub-field may further indicate the volume of the upgraded data area.

Further, the data sub-field may be may be arranged right after the instruction sub-field. As shown in FIG. 4, the data sub-field may be of 8N bits, wherein N is greater than zero and is smaller than 8. In addition, the configuration of the instruction sub-field and the data sub-field may be configured accordingly. In another example, the length of the data sub-field of the data frame may be adjusted according to the volume of the data.

In another example, the data field of the data frame may include other sub-fields according to real scenarios.

The frame transmission process relates to one transmission between the communication nodes. In an example where the bus includes the communications nodes A, B and C, the node A transmits the data to the node B, the frame-number indication sub-field records the frame number sent from node A to node B. When the frame has been transmitted, the message including the completion indication sub-field is sent to node B. The node A sends another frame to node C to initiate another frame transmission process.

A length of the frame mode indication sub-field may be configured according to the number of the instructions in real scenarios. In an example, the frame-number indication sub-field may include 8 bits. In this example, the 8-bit self-increasing cyclic code can be used to count the data frames.

In an example, in step S103, receiving an abnormal indication frame indicating an abnormal frame transmission.

In an example, when the frame-number indication sub-field includes N bits, the initial frame number equals to zero. The frame number is increased by one, i.e., (n+1), wherein n is a positive integer smaller than $2^N$. When the frame number equals to $(2^(N-1)-1)$, one half of the frame numbers have been consumed. At this moment, the receiving end may send the abnormal indication frame for indicating the abnormal frame transmission, such as failing to receive the data frame or the data frame has not been received correctly. Afterward, the abnormal frame may be resent, i.e., the abnormal frame may be automatically resent or may be resent by a mixed-automatic method, which is not limited to the present disclosure. After the frame has been received correctly, the transmitting end re-sent the data frame having the frame number equals to $2^(N-1)$. Under the circumstance, all of the frame numbers have been consumed, the transmitting end may receive the abnormal indication frame from the receiving end.

In one example, the receiving end sends the abnormal indication frame to the transmitting end upon determining the abnormal data transmission.

In one example, the completion indication sub-field may be of 1 bits. When the completion indication sub-field equals to one, it is determined that the last frame has been transmitted during the frame transmission process. When the completion indication sub-field equals to zero, it is determined that the frame being sent is not the last frame.

With respect to the above method, the transmitted data frame includes the frame mode indication sub-field indicating the frame mode of the data frame, wherein the frame mode indicates the type of the information carried by the data frame. For instance, the information carried by the data frame may include communication node control messages, data control information, or data. During the data transmission process, the receiving end may identify the frame mode of the data frame according to the information carried by the frame mode indication sub-field so as to quickly and precisely determine the type of the information carried by the data frame. Also, the data frame may include the instruction sub-field carrying the instruction messages being classified into a variety of types, and the instruction messages are indicative of different operations of the receiving ends, which are requested by the transmitting end. During the transmission, the receiving end may recognize the instruction messages of the data frame directly. In another aspect, the data frame may include the frame-number indication sub-field and the completion indication sub-field. During the data transmission process, the receiving end obtains the frame number of the data frame according to the information carried by the frame-number indication sub-field, and the obtains the transmission status of the frames according to the completion indication sub-field.

In this way, the transmission efficiency of the control message and the data message may be greatly enhanced.

Figure 5:
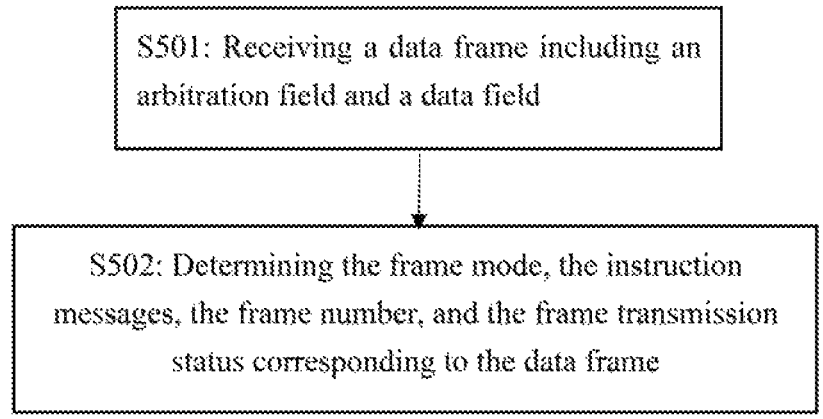
FIG. 5 is a flowchart illustrating the frame transmission method in accordance with a second embodiment of the present disclosure.
Figure 6:
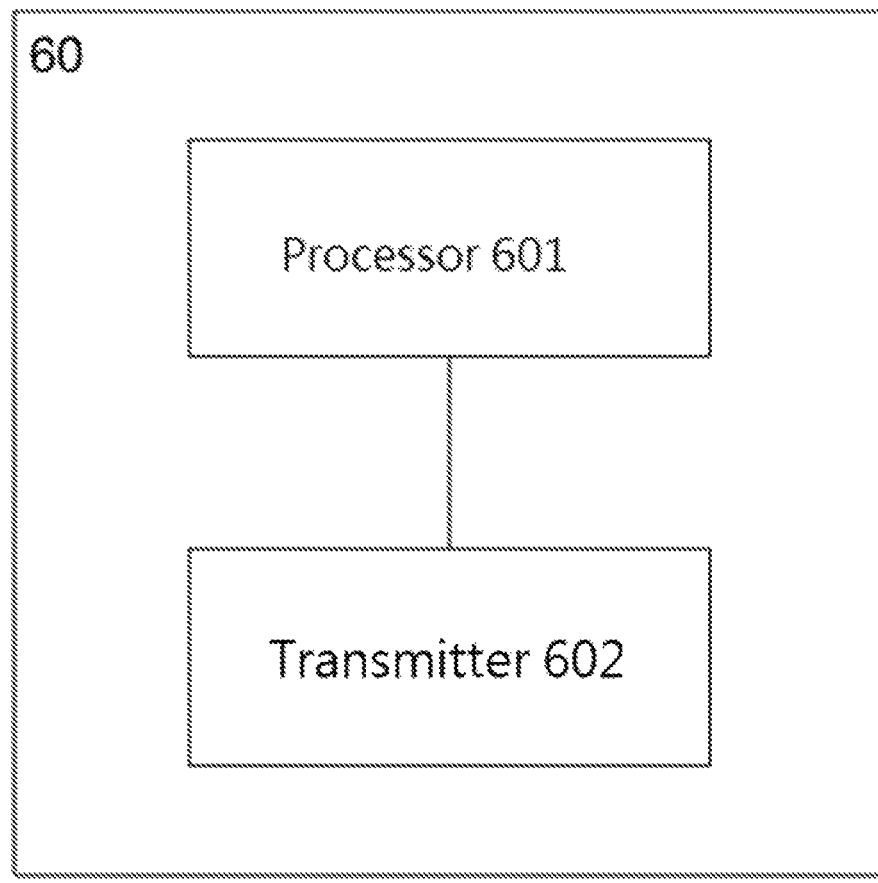
FIG. 6 is a schematic view of the frame transmission device in accordance with one embodiment of the present disclosure.

The present disclosure also relates to a frame transmission method. As shown in FIG. 5, the method further includes the following steps.

In step S501, receiving at least one data frame, wherein the data frame includes an arbitration field and a data field, wherein the arbitration field includes a frame mode indication sub-field indicating a frame mode of the data frame, and the data field includes the instruction sub-field indicating instruction messages carried within the data frame.

In another example, the arbitration field also includes a frame-number indication field and a completion indication sub-field. The frame-number indication sub-field indicates a frame number of the data frames, and the frame number is a positive integer smaller than $2^N$, wherein N relates to a number of bits for the frame-number indication sub-field, and the completion indication sub-field indicates a frame transmission status.

In step S502, receiving the frame mode indication sub-field to determine the frame mode of the data frame, and receiving the instruction sub-field to determine the instruction messages carried by the data frame.

In an example, the method further includes the a step S503.

In step S503, sending the abnormal indication frame indicating the abnormal frame transmission.

In step S501, the received data frame is shown as in FIGS. 2A-2C, 3A-3B, and 4. It can be understood that the terms, including the data frame, the arbitration field, the frame mode indication sub-field, the data field, the instruction sub-field, the frame-number indication sub-field, and the completion indication sub-field may be referred to the same terms as in step S101, and thus the definitions of those terms are omitted hereinafter.

In step S502, the communication node determines the frame mode of the data frame according to the frame mode indication sub-field, and determines the instruction messages of the received data frame according to the instruction sub-field received by the communication nodes.

In another example, the communication node determines the frame number of the data frame according to the frame-number indication sub-field of the data frame, and determines the transmission status of the frames according to the completion indication sub-field.

In an example, when the received data frame is the standard data frame, the communication node obtains the information carried by the standard frame mode indication sub-field so as to determine the frame mode of the data frame. For instance, when the standard frame mode indication sub-field equals to "00", it is determined that the data frame is the node control instruction frame according to Table. 2.

In an example, when the received data frame is the expanded data frame, the communication node obtains the information carried by the expanded frame mode indication sub-field so as to determine the frame mode of the data frame. For instance, when the standard frame mode indication sub-field equals to "010", it is determined that the data frame is the node return instruction frame according to Table. 3.

In an example, when the instruction sub-field sent from the master node is "FE", according to Table. 4, it can be determined that the instruction messages relates to the instructions requesting attributes. Thus, the corresponding operations relates to uploading the node attributes.

In an example, when the frame-number indication sub-field sent from the transmitting end equals to "00103010", the frame number equals to 42, that is, the frame is the 43-th frame during the frame transmission process.

In an example, when the completion indication sub-field sent from the transmitting end equals to zero, it is determined that the frame transmission process has not finished. When the completion indication sub-field sent from the transmitting end equals to one, it is determined that the frame transmission process is finished When the receiving end receives the abnormal indication frame, or when the frame number satisfies a predetermined condition, the receiving end sends the abnormal indication frame to the transmitting end for indicating the abnormal indication frame during the frame transmission process.

The present disclosure also relates to a frame transmission device 60 having the components including:

A processor 601 for generating a data frame and a data field, wherein the data frame includes an arbitration field having a frame mode indication sub-field indicating a frame mode of the data frame, and the data field includes the instruction sub-field indicating instruction messages carried by the data frame.

In an example, the arbitration field also includes a frame-number indication field and a completion indication sub-field. The frame-number indication sub-field indicates a frame number of the data frames, and the frame number is a positive integer smaller than 2^N, wherein N relates to a number of bits for the frame-number indication sub-field, and the completion indication sub-field indicates the transmission status of the frames.

A transmitter 602 configured to send the data frame generated by the processor 601.

In an example, when the data frame is a standard data frame, the frame mode indication sub-field may indicate any one of the frame modes of the data frame. The frame modes are shown as below.

A node control instruction frame; or a node return instruction frame.

In an example, the standard frame mode indication sub-field may be of 2 bits.

In an example, the frame mode indication sub-field may be an expanded frame mode indication sub-field for indicating one of the frame modes, including node control instruction frame, Node return instruction frame, String code frame of uploading node, Identification frame of configuring node, block control instruction, frame, block return instruction frame, output frame of data block, or input frame of data block.

In an example, the expanded frame mode indication sub-field may be of 3 bits.

In an example, the instruction messages may include node instruction messages or block instruction messages, wherein the node instruction messages relate to the instructions for the communication nodes, and the block instruction messages relate to the instructions for the transmitted data blocks.

In an example, the data field of the data frame may include the data sub-field indicative of information corresponding to the data.

In an example, the instruction sub-field may be of 8 bits, and the instruction sub-field may be arranged prior to the data sub-field.

In an example, the data sub-field may be of 8N bits, wherein N is greater than zero and is smaller than 8.

In an example, the initial frame number equals to zero.

In one example, the completion indication sub-field may be of 1 bits. When the completion indication sub-field equals to one, it is determined that the last frame has been transmitted during the frame transmission process. When the completion indication sub-field equals to zero, it is determined that the frame being sent is not the last frame.

The frame transmission device 60 may be adopted to execute the method in FIG. 1. In an example, the processor 601 executes the steps S101 and S102. In an example, the transmitter 602 also executes the step S103, and the descriptions regarding the steps S101, S102, and S103, may be referenced in the above disclosure.

With respect to the above device, the transmitted data frame includes the frame mode indication sub-field indicating the frame mode of the data frame and the instruction sub-field of the data frame indicating the instruction messages, wherein the frame mode indicates the type of the information carried by the data frame, and the instruction messages indicate the operations of the receiving end requested by the transmitting end. For instance, the information carried by the data frame may include communication node control messages, data control information, or data. During the data transmission process, the receiving end may identify the frame mode of the data frame according to the information carried by the frame mode indication sub-field so as to quickly and precisely determine the type of the information carried by the data frame. Also, the receiving end may quickly recognize the instruction messages of the data frame according to the instruction sub-field. In this way, the transmission efficiency of the control message and the data message may be greatly enhanced.

Figure 7:
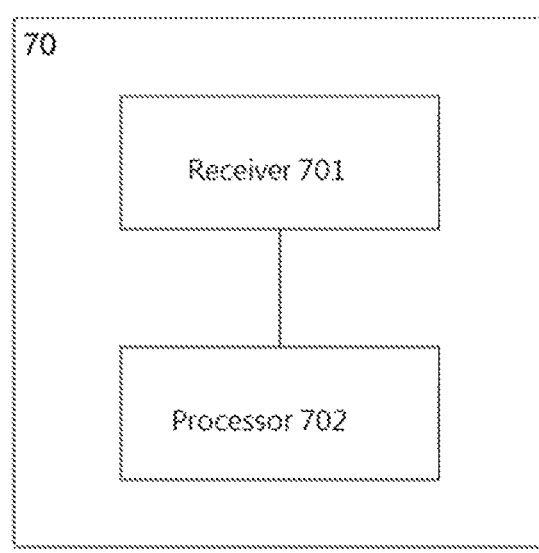
FIG. 7 is a schematic view of the frame transmission device in accordance with another embodiment of the present disclosure.

The present disclosure also relates to a frame transmission device 70, as shown in FIG. 7, having the components including:

A receiver 701 is configured to receive the data frame, wherein the data frame includes an arbitration field and a data field, wherein the arbitration field includes a frame mode indication sub-field indicating a frame mode of the data frame, and the data field includes the instruction sub-field indicating instruction messages carried within the data frame.

In another example, the receiver 701 is configured to receive the abnormal indication frame indicating the abnormal frame transmission.

A processor 702 configured to receive the frame mode indication sub-field to determine the frame mode of the data frame, and to receive the instruction sub-field to determine the instruction messages carried by the data frame.

In an example, when the data frame is a standard data frame, the frame mode indication sub-field may indicate any one of the frame modes of the data frame. The frame modes are shown as below.

A node control instruction frame; or a node return instruction frame.

In an example, the standard frame mode indication sub-field may be of 2 bits.

In an example, the frame mode indication sub-field may be an expanded frame mode indication sub-field for indicating one of the frame modes, including node control instruction frame, Node return instruction frame, String code frame of uploading node, Identification frame of configuring node, block control instruction frame, block return instruction frame, output frame of data block, or input frame of data block.

In an example, the expanded frame mode indication sub-field may be of 3 bits.

In an example, the instruction messages may include node instruction messages or block instruction messages, wherein the node instruction messages relate to the instructions, for the communication nodes, and the block instruction messages relate to the instructions for the transmitted data blocks.

In an example, the data field of the data frame may include the data sub-field indicative of information corresponding to the data.

In an example, the instruction sub-field may be of 8 bits, and the instruction sub-field may be arranged prior to the data sub-field.

In an example, the data sub-field may be of 8N bits, wherein N is greater than zero and is smaller than 8.

The frame transmission device 70 may be adopted to execute the method in FIG. 5. In an example, the processor 701 executes the steps S501 and S502. In an example, the transmitter 702 also executes the step S503, and the descriptions regarding the steps may be referenced in the above disclosure.

In the case of a robot, the master node, i.e., a robot main controller, and controlled nodes, i.e., a number of servos, may be any one of the frame transmission device described above. That is, the master node or the controlled nodes each may include the processor, the transmitter, and the receiver.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A frame transmission method, comprising:
generating a data frame, wherein the data frame comprises an arbitration field and a data field, the arbitration field comprising a frame mode indication sub-field indicating a frame mode of the data frame, and the data field comprising an instruction sub-field indicating instruction messages carried within the data frame; and
sending the data frame;
wherein the data frame is one of a standard data frame and an expanded data frame, a length of the frame mode indication sub-field in the standard data frame is less than a length of the frame mode indication sub-field in the expanded data frame, and the frame mode indication sub-field indicates purpose of the data frame.

2. The method as claimed in claim 1, wherein:
the frame mode indication sub-field comprises a standard frame mode indication sub-field indicating any one of the frame modes comprising a node control instruction frame and a node return instruction frame;
a length of the standard frame mode indication sub-field is 2 bits in response to the data frame being the standard frame mode; and
the instruction messages comprises node instruction messages or block instruction messages, wherein the node instruction messages are directed to instructions for the communication nodes, and the block instruction messages are directed to the instructions for the transmitted data blocks.

3. The method as claimed in claim 2, wherein the arbitration field also comprises a frame-number indication sub-field and a completion indication sub-field, wherein the frame-number indication sub-field indicates a frame number of the data frames, and the frame number is a positive integer smaller than $2^N$, N relates to a number of bits for the frame-number indication sub-field, and the completion indication sub-field indicates a frame transmission status.

4. The method as claimed in claim 1, wherein the frame mode indication sub-field comprises an expanded frame mode indication sub-field indicating any one of the frame modes comprising: node control instruction frame, node return instruction frame, string code frame of uploading node, identification frame of configuring node, block control instruction frame, block return instruction frame, output frame of data block, or input frame of data block; and
a length of the expanded frame mode indication sub-field is 3 bits in response to the data frame being the expanded frame mode.

5. The method as claimed in claim 2, wherein:
the data field of the data frame comprises a data sub-field indicative of information corresponding to the data frame, the data sub-field is of 8N bits, wherein N is a positive integer, and N is greater than zero and is smaller than 8; and
the instruction sub-field is of 8 bits, and the instruction sub-field is arranged prior to the data sub-field.

6. A frame transmission method, comprising:
receiving at least one data frame, wherein the data frame comprises an arbitration field and a data field, the arbitration field having a frame mode indication sub-field indicating a frame mode of the data frame, and the data field comprising an instruction sub-field indicating instruction messages carried within the data frame;
determining the frame mode of the data frame according to the frame mode indication sub-field received; and
determining the instruction messages carried by the data frame according to the instruction sub-field received;
wherein the data frame is one of a standard data frame and an expanded data frame, a length of the frame mode indication sub-field in the standard data frame is less than a length of the frame mode indication sub-field in the expanded data frame, and the frame mode indication sub-field indicates purpose of the data frame.

7. The method as claimed in claim 6, wherein:
the frame mode indication sub-field comprises a standard frame mode indication sub-field indicating any one of the frame modes comprising a node control instruction frame and a node return instruction frame;

a length of the standard frame mode indication sub-field is 2 bits in response to the data frame being the standard frame mode; and
the instruction messages comprises node instruction messages or block instruction messages, wherein the node instruction messages are directed to instructions for the communication nodes, and the block instruction messages are directed to the instructions for the transmitted data blocks.

8. The method as claimed in claim 7, wherein the arbitration field also comprises a frame-number indication sub-field and a completion indication sub-field, wherein the frame-number indication sub-field indicates a frame number of the data frames, and the frame number is a positive integer smaller than $2^N$, N relates to a number of bits for the frame-number indication sub-field, and the completion indication sub-field indicates a frame transmission status.

9. The method as claimed in claim 6, wherein the frame mode indication sub-field comprises an expanded frame mode indication sub-field indicating any one of the frame modes comprising: node control instruction frame, node return instruction frame, string code frame of uploading node, identification frame of configuring node, block control instruction frame, block return instruction frame, output frame of data block, or input frame of data block; and
a length of the expanded frame mode indication sub-field is 3 bits in response to the data frame being the expanded frame mode.

10. The method as claimed in claim 7, wherein:
the data field of the data frame comprises a data sub-field indicative of information corresponding to the data frame, the data sub-field is of 8N bits, wherein N is a positive integer, and N is greater than zero and is smaller than 8; and
the instruction sub-field is of 8 bits, and the instruction sub-field is arranged prior to the data sub-field.

11. A frame transmission device, comprising:
a processor;
a transmitter; and
a receiver;
wherein the processor is configured to generate or receive a data frame, wherein the data frame comprises an arbitration field and a data field, the arbitration field comprises a frame mode indication sub-field indicating a frame mode of the data frame, and the data field comprising an instruction sub-field indicating instruction messages carried within the data frame;
the transmitter or receiver is configured to send or receive the data frame from or for the processor, and the processor is also configured to receive the frame mode indication sub-field to determine the frame mode of the data frame;
wherein the data frame is one of a standard data frame and an expanded data frame, a length of the frame mode indication sub-field in the standard data frame is less than a length of the frame mode indication sub-field in the expanded data frame, and the frame mode indication sub-field indicates purpose of the data frame.

12. The device as claimed in claim 11, wherein:
the frame mode indication sub-field comprises a standard frame mode indication sub-field indicating any one of the frame modes comprising a node control instruction frame and a node return instruction frame;
a length of the standard frame mode indication sub-field is 2 bits in response to the data frame being the standard frame mode; and
the instruction messages comprises node instruction messages or block instruction messages, wherein the node instruction messages are directed to instructions for the communication nodes, and the block instruction messages are directed to the instructions for the transmitted data blocks.

13. The device as claimed in claim 12, wherein the arbitration field also comprises a frame-number indication sub-field and a completion indication sub-field, wherein the frame-number indication sub-field indicates a frame number of the data frames, and the frame number is a positive integer smaller than $2^N$, N relates to a number of bits for the frame-number indication sub-field, and the completion indication sub-field indicates a frame transmission status.

14. The device as claimed in claim 11, wherein the frame mode indication sub-field comprises an expanded frame mode indication sub-field indicating any one of the frame modes comprising: node control instruction frame, node return instruction frame, string code frame of uploading node, identification frame of configuring node, block control instruction frame, block return instruction frame, output frame of data block, or input frame of data block; and
a length of the expanded frame mode indication sub-field is 3 bits in response to the data frame being the expanded frame mode.

15. The device as claimed in claim 12, wherein:
the data field of the data frame comprises a data sub-field indicative of information corresponding to the data frame, the data sub-field is of 8N bits, wherein N is a positive integer, and N is greater than zero and is smaller than 8; and
the instruction sub-field is of 8 bits, and the instruction sub-field is arranged prior to the data sub-field.

16. The method as claimed in claim 2, wherein:
the node control instruction frame is a frame having the greatest priority;
the node control instruction frame is sent from a master node to a controlled node for indicating the controlled node to execute actions corresponding to the node control instruction frame, in response to the controlled node being a steering gear or a driving wheel;
the node control instruction frame is sent from the master node to the controlled node for indicating the controlled node to collect data and report the data, in response to the controlled node being a sensor; and
the node return instruction frame is sent from the controlled node to the master node for responding to the instructions received by the controlled node.

17. The method as claimed in claim 4, wherein:
the node control instruction frame is a frame having the greatest priority;
the node control instruction frame is sent from a master node to a controlled node for indicating the controlled node to execute actions corresponding to the node control instruction frame, in response to the controlled node being a steering gear or a driving wheel;
the node control instruction frame is sent from the master node to the controlled node for indicating the controlled node to collect data and report the data, in response to the controlled node being a sensor;
the node return instruction frame is sent from the controlled node to the master node for responding to the instructions received by the controlled node;
the string code frame of uploading node is sent from the controlled node to the master node for indicating attributes of the controlled node;

the identification frame of configuring node is sent from the master node to the controlled node for allocating Channel ID for the controlled node;

the block control instruction frame is sent from the master node to the controlled node to control the transmission of data blocks;

the block return instruction frame is sent from the controlled node to the master node in response to the received instruction of data transmission;

the output frame of data block is configured to control the master node to send data; and the input frame of data block is configured to control the controlled node to send data.

18. The method as claimed in claim 5, wherein a length of the data sub-field of the data frame is adjusted according to the volume of the data.

19. The method as claimed in claim 3, wherein:

the frame-number indication sub-field comprises N bits, an initial frame number of the data frames equals to zero, the frame number of the data frames is increased by one (n+1), n is a positive integer smaller than $2^N$; and a abnormal indication frame for indicating a abnormal frame transmission is sent by a receiving end when the frame number equals to $(2^{(N-1)}-1)$, the abnormal frame is resent, and a data frame having the frame number equals to $2^{(N-1)}$ is resent by a transmitting end after the abnormal frame has been received correctly.

20. The method as claimed in claim 19, wherein:

the abnormal indication frame is received by the transmitting end from the receiving end, in response to all of the frame numbers having been consumed.

* * * * *